US012339720B2

(12) United States Patent
Ali et al.

(10) Patent No.: US 12,339,720 B2
(45) Date of Patent: Jun. 24, 2025

(54) TECHNIQUES FOR SUPPORTING MULTIPLE POWER SUPPLY UNITS

(71) Applicant: Lenovo (Singapore) Pte. Ltd., New Tech Park (SG)

(72) Inventors: Omar Ali, Cary, NC (US); Alan L. Painter, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 57 days.

(21) Appl. No.: 18/323,154

(22) Filed: May 24, 2023

(65) Prior Publication Data

US 2024/0393851 A1 Nov. 28, 2024

(51) Int. Cl.
*G06F 1/26* (2006.01)
(52) U.S. Cl.
CPC ..................... *G06F 1/263* (2013.01)
(58) Field of Classification Search
CPC ................... G06F 1/26; G06F 1/263
See application file for complete search history.

(56) References Cited

U.S. PATENT DOCUMENTS

| | | | | |
|---|---|---|---|---|
| 9,690,365 B2* | 6/2017 | Mair | ...................... | G06F 1/3275 |
| 10,141,045 B2* | 11/2018 | Cheng | ................. | H01L 23/5286 |
| 10,499,525 B1* | 12/2019 | Singh | ....................... | H05K 5/03 |
| 10,802,560 B2* | 10/2020 | Hijazi | ........................ | G06F 1/26 |
| 11,102,407 B2* | 8/2021 | Kawamoto | ............ | H04N 23/65 |
| 2009/0327770 A1* | 12/2009 | Lin | ......................... | G06F 1/263 |
| | | | | 713/300 |
| 2017/0177068 A1* | 6/2017 | Cooper | ................. | G06F 1/3287 |

OTHER PUBLICATIONS

"What is an ATX-style connector?"—retrieved from "https://www.javatpoint.com/what-is-an-atx-style-connector" on Sep. 18, 2024; 10 pages (Year: 2024).*

* cited by examiner

*Primary Examiner* — Brian T Misiura
(74) *Attorney, Agent, or Firm* — Kunzler Bean & Adamson

(57) ABSTRACT

Apparatuses, systems, and methods are disclosed for techniques for supporting multiple PSUs. An apparatus includes a motherboard and a switch coupled to the motherboard for controlling power supply to the motherboard from a PSU. In response to detecting a single-rail PSU connected to the motherboard, the switch is closed in response to a power-on signal to provide main power from the PSU to the motherboard and the switch is opened in response to a standby signal to cut main power from the PSU to the motherboard. In response to detecting a dual-rail PSU connected to the motherboard, the switch is opened and bypassed such that main power to the motherboard is controlled by the PSU via transmission of the power-on signal and the standby signal.

18 Claims, 4 Drawing Sheets

TECHNIQUES FOR SUPPORTING MULTIPLE POWER SUPPLY UNITS

FIELD

The subject matter disclosed herein relates to computing devices and more particularly relates to techniques for supporting multiple power supply units ("PSUs").

BACKGROUND

Computing devices may be powered by a PSU that provides and distributes electricity from a power source to various components of the computing device. Different PSUs may have different configurations or specifications for managing power distribution for a computing device.

BRIEF SUMMARY

Apparatuses, systems, and methods are disclosed for techniques for supporting multiple PSUs. An apparatus, in one embodiment, includes a motherboard and a switch coupled to the motherboard for controlling power supply to the motherboard from a PSU. In one embodiment, in response to detecting a single-rail PSU connected to the motherboard, the switch is closed in response to a power-on signal to provide main power from the PSU to the motherboard and the switch is opened in response to a standby signal to cut main power from the PSU to the motherboard. In one embodiment, in response to detecting a dual-rail PSU connected to the motherboard, the switch is opened and bypassed such that main power to the motherboard is controlled by the PSU via transmission of the power-on signal and the standby signal.

A system, in one embodiment, includes a motherboard, a PSU operationally coupled to the motherboard, and a switch coupled to the motherboard for controlling power supply to the motherboard from a PSU. In one embodiment, in response to detecting a single-rail PSU connected to the motherboard, the switch is closed in response to a power-on signal to provide main power from the PSU to the motherboard and the switch is opened in response to a standby signal to cut main power from the PSU to the motherboard. In one embodiment, in response to detecting a dual-rail PSU connected to the motherboard, the switch is opened and bypassed such that main power to the motherboard is controlled by the PSU via transmission of the power-on signal and the standby signal.

A method, in one embodiment, includes detecting that a PSU is connected to a motherboard, the motherboard comprising a switch for controlling power supply to the motherboard from the PSU. In one embodiment, the method includes, in response to detecting that the PSU is a single-rail PSU, closing the switch in response to a power-on signal to provide main power from the PSU to the motherboard and opening the switch in response to a standby signal to cut main power from the PSU to the motherboard. In one embodiment, the method includes, in response to detecting that the PSU is a dual-rail PSU, opening and bypassing the switch such that main power to the motherboard is controlled by the PSU via transmission of the power-on signal and the standby signal.

In one embodiment, the apparatus includes a PSU connector that is coupled to the motherboard for interfacing with the dual-rail PSU.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
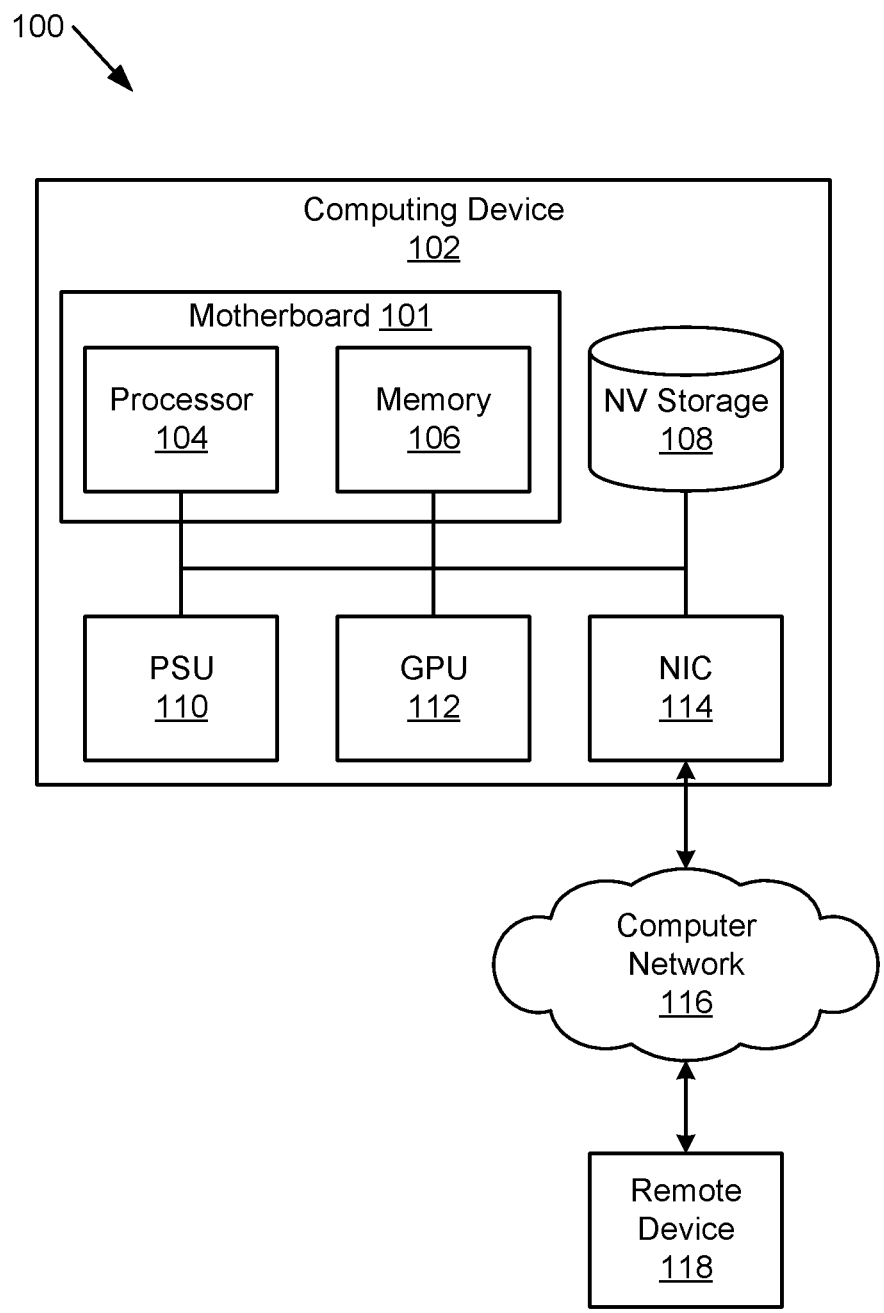
FIG. 1 is a schematic block diagram illustrating one embodiment of a computing device that supports techniques for supporting multiple PSUs in accordance with the subject matter disclosed herein.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatuses, systems, and methods are disclosed for techniques for supporting multiple PSUs. An apparatus, in one embodiment, includes a motherboard and a switch coupled to the motherboard for controlling power supply to the motherboard from a PSU. In one embodiment, in response to detecting a single-rail PSU connected to the motherboard, the switch is closed in response to a power-on signal to provide main power from the PSU to the motherboard and the switch is opened in response to a standby signal to cut main power from the PSU to the motherboard. In one embodiment, in response to detecting a dual-rail PSU connected to the motherboard, the switch is opened and bypassed such that main power to the motherboard is controlled by the PSU via transmission of the power-on signal and the standby signal.

In one embodiment, the apparatus includes a PSU connector that is coupled to the motherboard for interfacing with the dual-rail PSU.

In one embodiment, the PSU connector comprises an edge connector that is coupled to an edge of the motherboard.

In one embodiment, the edge connector comprises one or more electrical pins that are configured to detect a connection between the dual-rail PSU and the motherboard.

In one embodiment, the switch is opened in response to detecting the connection between the dual-rail PSU and the motherboard via the edge connector.

In one embodiment, the apparatus includes a power distribution board ("PDB") coupled to the dual-rail PSU and the edge connector for facilitating power distribution from the dual-rail PSU to the motherboard and other hardware components.

In one embodiment, the power-on signal and the standby signal are transmitted to the dual-rail PSU via the PDB.

In one embodiment, the apparatus includes means for preventing the single-rail PSU and the dual-rail PSU from being operationally connected to the motherboard simultaneously.

In one embodiment, the switch comprises a metal-oxide-semiconductor field-effect transistor ("MosFET").

In one embodiment, the switch is closed in response to a PSON_MB_N signal from the motherboard.

A system, in one embodiment, includes a motherboard, a PSU operationally coupled to the motherboard, and a switch coupled to the motherboard for controlling power supply to the motherboard from a PSU. In one embodiment, in response to detecting a single-rail PSU connected to the motherboard, the switch is closed in response to a power-on signal to provide main power from the PSU to the motherboard and the switch is opened in response to a standby signal to cut main power from the PSU to the motherboard. In one embodiment, in response to detecting a dual-rail PSU connected to the motherboard, the switch is opened and bypassed such that main power to the motherboard is controlled by the PSU via transmission of the power-on signal and the standby signal.

In one embodiment, the system includes a PSU connector that is coupled to the motherboard for interfacing with the dual-rail PSU.

In one embodiment, the PSU connector comprises an edge connector that is coupled to an edge of the motherboard.

In one embodiment, the edge connector comprises one or more electrical pins that are configured to detect a connection between the dual-rail PSU and the motherboard.

In one embodiment, the switch is opened in response to detecting the connection between the dual-rail PSU and the motherboard via the edge connector.

In one embodiment, the system includes a PDB coupled to the dual-rail PSU and the edge connector for facilitating power distribution from the dual-rail PSU to the motherboard and other hardware components.

In one embodiment, the power-on signal and the standby signal are transmitted to the dual-rail PSU via the PDB.

In one embodiment, the system includes means for preventing the single-rail PSU and the dual-rail PSU from being operationally connected to the motherboard simultaneously.

In one embodiment, the switch comprises a MosFET.

In one embodiment, the switch is closed in response to a PSON_MB_N signal from the motherboard.

A method, in one embodiment, includes detecting that a PSU is connected to a motherboard, the motherboard comprising a switch for controlling power supply to the motherboard from the PSU. In one embodiment, the method includes, in response to detecting that the PSU is a single-rail PSU, closing the switch in response to a power-on signal to provide main power from the PSU to the motherboard and opening the switch in response to a standby signal to cut main power from the PSU to the motherboard. In one embodiment, the method includes, in response to detecting that the PSU is a dual-rail PSU, opening and bypassing the switch such that main power to the motherboard is controlled by the PSU via transmission of the power-on signal and the standby signal.

In one embodiment, the motherboard includes a PSU connector that is coupled to the motherboard for interfacing with the dual-rail PSU.

In one embodiment, the PSU connector comprises an edge connector that is coupled to an edge of the motherboard.

In one embodiment, the edge connector comprises one or more electrical pins that are configured to detect a connection between the dual-rail PSU and the motherboard.

In one embodiment, further comprising opening the switch in response to detecting the connection between the dual-rail PSU and the motherboard via the edge connector.

In one embodiment, a PDB is coupled to the dual-rail PSU and the edge connector for facilitating power distribution from the dual-rail PSU to the motherboard and other hardware components.

In one embodiment, further comprising transmitting the power-on signal and the standby signal to the dual-rail PSU via the PDB.

In one embodiment, further comprising preventing the single-rail PSU and the dual-rail PSU from being operationally connected to the motherboard simultaneously.

In one embodiment, the switch comprises a MosFET.

In one embodiment, further comprising closing the switch in response to a PSON_MB_N signal from the motherboard.

In general, computing devices are powered by at least one PSU. PSUs may have different configurations, specifications, connections, or the like, which may necessitate designing different computing components such as motherboards to interface with the various PSUs. The subject matter disclosed herein, however, provides solutions for allowing single-rail and dual/multiple rail PSUs to be connected to the same motherboard.

FIG. 1 is a schematic block diagram illustrating a system 100 the supports techniques for supporting multiple PSUs, according to various embodiments. The system 100 includes a computing device 102, which may include a personal computer, a server device, and/or the like. Other embodiments of the computing device 102 may include a workstation, an Internet of Things device, a consumer computing device, an enterprise computing device, and/or the like. The computing device 102, in some embodiments, may include a processor 104 (e.g., a central processing unit ("CPU"), a processor core, an FPGA or other programmable logic, an application specific integrated circuit ("ASIC"), a controller, a microcontroller, and/or another semiconductor integrated circuit device), a memory 106 such as a volatile memory, and/or a non-volatile storage device 108, such as solid-state storage, a hard disk drive, or the like. In some embodiments, the memory 106 of the computing device 102 is embodied as at least one DIMM, a single in-line memory module ("SIMM"), or the like.

In one embodiment, the processor 104, memory 106, and/or other computing components may be coupled or connected to a motherboard 101. As used herein, the motherboard 101 is the main printed circuit board ("PCB") in computers and other expandable systems. It holds and allows communication between many of the crucial electronic components of a system, such as the processor 104 and memory 106, and provides connectors for other peripherals. A motherboard usually contains significant sub-systems, such as the processor 104, the chipset's input/output and memory controllers, interface connectors, and other components integrated for general use.

In one embodiment, the computing device 102 includes a PSU 110. As used herein, the PSU 110 converts main alternating current ("AC") to low-voltage regulated direct current ("DC") power for the internal components of a computing device 102. The PSU 110 may conform to the Advanced Technology eXtended ("ATX") specification, which includes form factor and voltage tolerances. While an ATX power supply is connected to the main supply, it may provide standby power so that the standby functions on the computer and certain peripherals are powered. ATX power supplies are turned on and off by a signal from the motherboard 101. They also provide a signal to the motherboard 101 to indicate when the DC voltages are in spec, so that the computing device 102 is able to safely power up and boot.

In one embodiment, the PSU 110 may be a single-rail PSU or a dual-(or multiple) rail PSU. As used herein, a rail may be defined as a voltage source from which power can be drawn. A single-rail PSU, as used herein, provides power (12V) from the PSU 110 to the components of the computing device 102 from a single source. For example, a single rail means that the 12V that the PSU 110 pulls from the wall is running through a single circuit. A dual-rail or multiple-rail PSU, as used herein, provides power (12V) from the PSU 110 over multiple "rails" or pathways for different connectors. For example, each PCIe connector that goes to the graphics processing unit ("GPU") has a separate rail/trace, the CPU power cable has a trace, the 24-pin motherboard has a separate rail, and/or the like. In one embodiment, as explained in more detail below, a single-rail PSU is an "always-on" PSU 110 that includes a main power connection, but not an auxiliary or standby power connection, while a dual-rail or multiple-rail PSU includes a main power connection and a standby or auxiliary power connection to power some components of the computing device 110 without turning the main power connection of the PSU 110 on.

In one embodiment, the computing device 102 includes a GPU 112 that is a specialized electronic circuit designed to manipulate and alter memory to accelerate the creation of images in a frame buffer intended for output to a display device. GPUs 112 may be efficient at manipulating computer graphics and image processing. GPUs 112 may be more efficient than general-purpose CPUs for algorithms that process large blocks of data in parallel. A GPU 112 can be present on a video card or embedded on the motherboard.

In one embodiment, the computing device 102 includes a network interface controller ("NIC") 114 that connects the computing device 102 to a computer or data network 116. The NIC 114 may be configured to provide a wired (e.g., Ethernet) or wireless (e.g., Wi-Fi) connection to the computer network 116.

In one embodiment, the computer network 116 includes a local area network ("LAN"), a wide area network ("WAN"), the Internet, a fiber network, etc., and may be made up of multiple networks and/or network types. In some embodiments, the computer network 116 includes a wireless connection.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In some embodiments, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application. The remote device 118 may include a different computing device 102 such as a server, workstation, desktop, laptop, or the like that is accessible via the computing network 116.

Even though certain types and numbers of components of the computing device 102 are depicted in FIG. 1, one of skill in the relevant art will recognize, in light of this disclosure, that various components and numbers of components may be included in the computing device 102 without deviating from the solutions described herein.

Figure 2A:
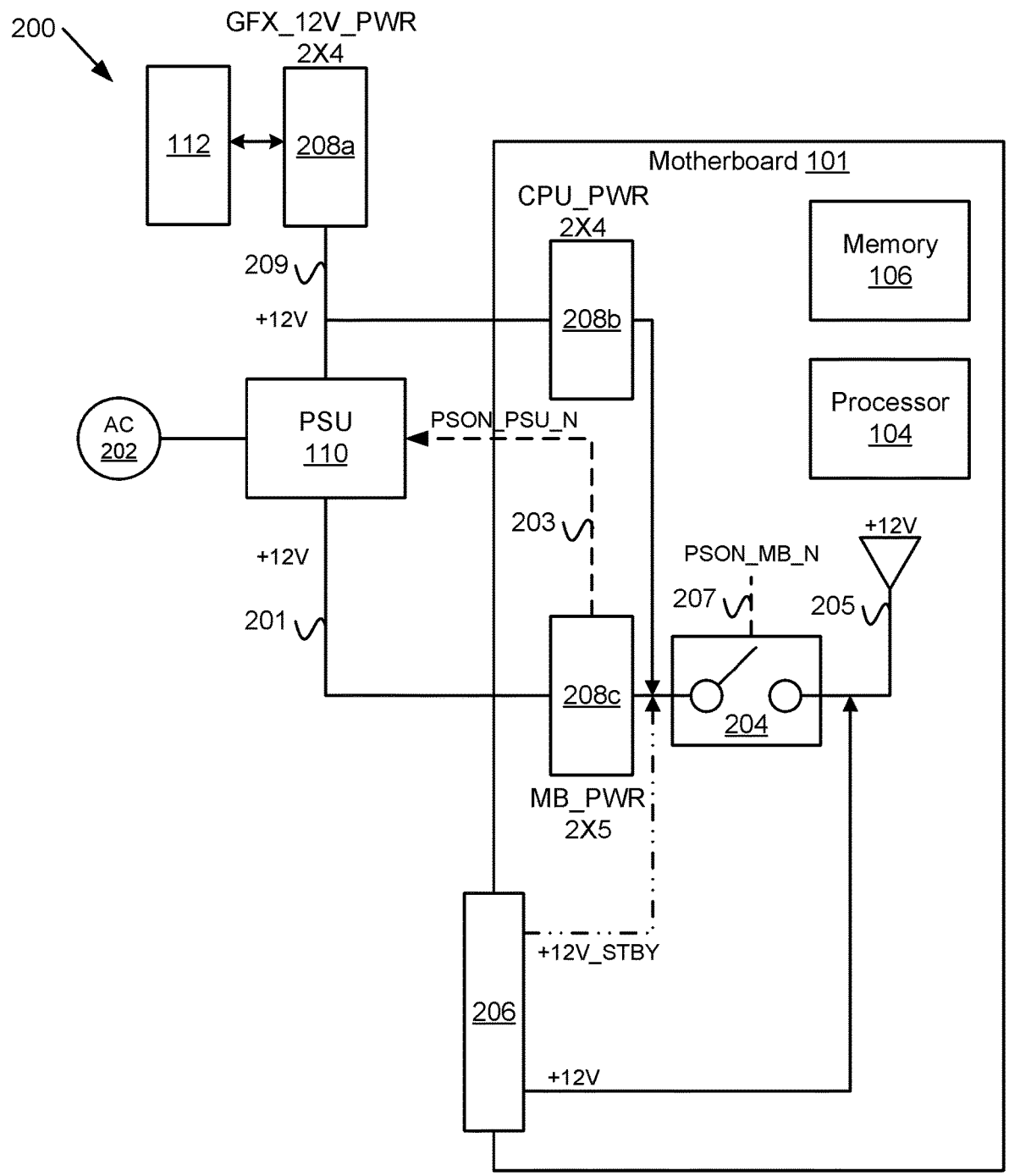
FIG. 2A is a schematic block diagram illustrating one embodiment of a system that supports techniques for supporting multiple PSUs in accordance with the subject matter disclosed herein.

FIG. 2A is a schematic block diagram illustrating one embodiment of a system 200 that supports techniques for supporting multiple PSUs in accordance with the subject matter disclosed herein. In one embodiment, the system 200 of FIG. 2A depicts a subset of the computing device 102 depicted in FIG. 1. In one embodiment, the system 200 includes a motherboard 101, a processor 104, a memory 106, and a PSU 110, as described above with reference to FIG. 1.

In the embodiment shown in FIG. 2A, the PSU 110 is embodied as a single-rail, "always-on" PSU that provides power (12V) 201 from a power source 202 (A/C power) to the motherboard 101 and other components or peripherals of the computing device 102, e.g., in response to a power-on signal 203 (e.g., PSON_PSU_N) from the motherboard 101 (e.g., from the processor 104 or other components). In such an embodiment, the PSU 110 provides constant, main power 201 to the motherboard 101 or other components, e.g., the GPU 112 via different connectors 208*a-c* on the motherboard 101 and/or the other components.

However, in certain situations, an "always-on" power connection may not be desired, e.g., if the computing device 102 is in a sleeping or standby state. In such an embodiment, the motherboard 101 includes a switch 204, which may be activated/deactivated, turned on/off, opened/closed, or the like to complete the power connection between the main power 201 and the motherboard power line 205.

In one embodiment, the switch 204 comprises a tangible, physical switch that is opened and closed in response to a signal 207 (e.g., a PSON_MB_N signal) from the motherboard 101. For instance, when the signal 207 is applied to the switch 204 (e.g., via one or more electrical lines or connections on the motherboard 101), the switch 204 is closed, completing the circuit between the PSU 110 and the motherboard 101, which provides power to the motherboard 101 and its components. In one embodiment, the switch 204 is embodied as a MosFET.

In such an embodiment, the motherboard 101 gates the 12V main power via the switch 204. The motherboard 101 (e.g., a chip or die on the motherboard 101) may assert the PSON_MB_N signal 207 (Active Low) to turn on the switch 204, which connects the PSU 12V rail 201 to the motherboard main 12V (S0) power 205. Further, the motherboard 101 may assert the PSON_PSU_N signal 203 (Active Low) to allow the PSU 110 to turn on the GFX 12V rail 209 for the GPU.

It is noted that, in one embodiment, the PSON_MB_N signal 203 will not be asserted if a connection to the edge connector 206 is detected, as described below with reference to FIG. 2B. In such an embodiment, the switch 204 will be off (e.g., in an open state) when a connection to the edge connector 206 is detected (e.g., when a PDB is connected to the edge connector 206). Furthermore, in the embodiment depicted in FIG. 2A, the GFX_12V_PWR connector 208*a* is connected directly to the GPU 112/graphics ("GFX") card installed in the computing device 102.

In this manner, the power supply 201 from the "always-on" PSU 110 can be selectively turned on and off at the motherboard 101 by means of the switch 204, which allows the computing device 102 to enter different states that do not require constant power such as a standby or sleep state.

Figure 2B:
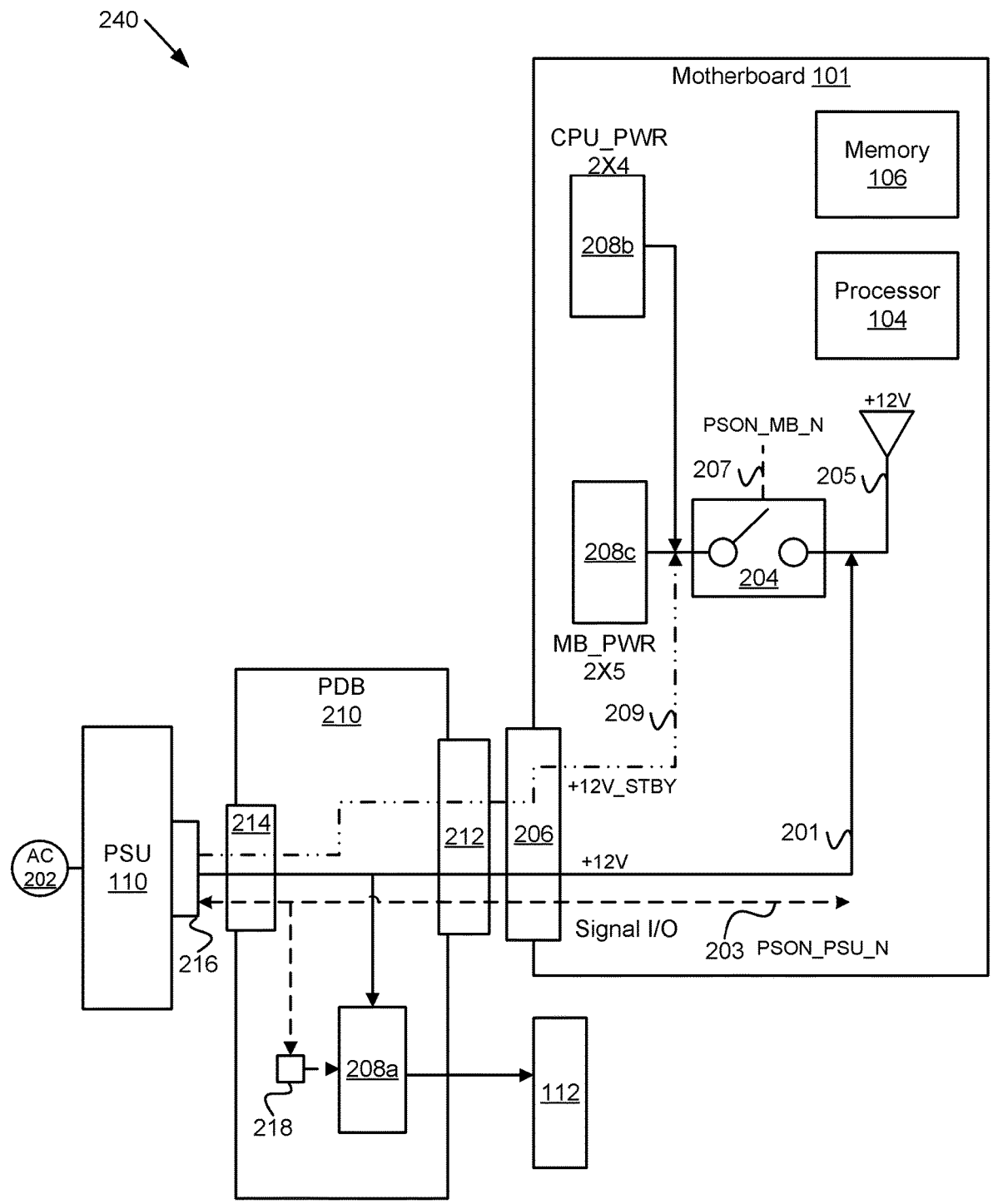
FIG. 2B is a schematic block diagram illustrating one embodiment of a system that supports techniques for supporting multiple PSUs in accordance with the subject matter disclosed herein.

FIG. 2B is a schematic block diagram illustrating one embodiment of a system 240 that supports techniques for supporting multiple PSUs in accordance with the subject matter disclosed herein. In one embodiment, the system 240 of FIG. 2B depicts a subset of the computing device 102 depicted in FIG. 1. In one embodiment, the system 200 includes a motherboard 101, a processor 104, a memory 106, and a PSU 110, as described above with reference to FIG. 1.

In the embodiment shown in FIG. 2B, the PSU 110 is embodied as a dual- or multiple-rail PSU that provides power (12V) from a power source 202 (A/C power) to the motherboard 101 and other components or peripherals of the computing device 102, e.g., in response to a power-on signal 203 (e.g., PSON_PSU_N) from the motherboard 101 (e.g., from the processor 104 or other components), via a main power line/rail 201 and a standby power line/rail 209 (which may provide lower voltage power than the main power line/rail 201). In such an embodiment, the PSU 110 provides main power 201 and standby power 209 to the motherboard 101 or other components, e.g., the GPU 112 via the edge connector 206 on the motherboard 101.

In the depicted embodiment, for the dual-rail PSU 110, the PSON_PSU_N signal 203 is connected to the PSU 110 and pulled low (e.g., via a chip or die on the motherboard 101) to turn the PSU 12V main power line 201 on. In one embodiment, the PSON_MB_N signal 207 is not asserted, such that the switch 204 remains in an open/off state to avoid shorting the 12V standby power line 209 to the 12V main power line 201. In one embodiment, the standby power line 209 is used to provide auxiliary power to various components of the computing device 102 and/or the motherboard 102 without turning on the main power 201 from the PSU 110.

The edge connector 206, in one embodiment, includes a connector configured to couple the PSU 110 to the motherboard 101 for main power 201, standby power 209, and signal 203 transmission. In one embodiment, the PSU 110 may be directly connected to the motherboard 101 via the edge connector 206. In another embodiment, the PSU 110 may be connected to the motherboard 101 via a PDB 210. In such an embodiment, the edge connector 206 may be embodied as a PDB straddle mount edge connector and the PDB 210 is embodied as a 1000 watt PSU PDB.

As used herein, a PDB 210 may refer to a PCB, card, device, or the like that divides or distributes the power 201/209 and/or signal 203 feeds from the PSU 110 to other components of the computing device 102, e.g., the GPU 112. In one embodiment, a PDB 210 may be used as an intermediate connection between the PSU 110 and the motherboard 101 if the PSU connector 216 does not orient or align with the edge connector 206 (e.g., if the PSU connector 216 has a horizontal orientation and the edge connector 206 has a vertical orientation). In such an embodiment, the PDB 210 may have connectors 212, 214 that are oriented or aligned to match the alignment of the edge connector 206 and the PSU connector 216 to facilitate the connection between the PSU 110 and the motherboard 101.

Furthermore, in one embodiment, the PDB 210 provides connectors for distributing power 201 and signals 203 to other components, e.g., a connector 208a for a GPU 112. In such an embodiment, the PDB 210 includes a general-purpose input/output ("GPIO") expander 218 that facilitates signal transmission to the various components that are connected to the PDB 210.

Thus, as described above with reference to FIGS. 2A and 2B, the introduction of the switching logic in the motherboard architecture allows a single motherboard 101 to manage connections to single- and dual/multiple-rail PSUs 110 (instead of requiring different motherboards 101 or motherboard configurations). The motherboard 101 can detect which type of PSU 110 is connected to the motherboard 101 and will operate accordingly, e.g., to enable/close or disable/open the switch 204. In such an embodiment, the motherboard 101 may include one or more electrical pins or sensors that are used to detect the type of PSU 110 that is connected to the motherboard 101. For instance, if a pin in the edge connector 206 indicates that a PDB 206 or a PSU 110 is connected to the edge connector 206, then the motherboard 101 may open the switch 204 to prevent a single-rail PSU from being operationally connected to the motherboard 101 simultaneously with the dual-rail PSU.

Figure 3:
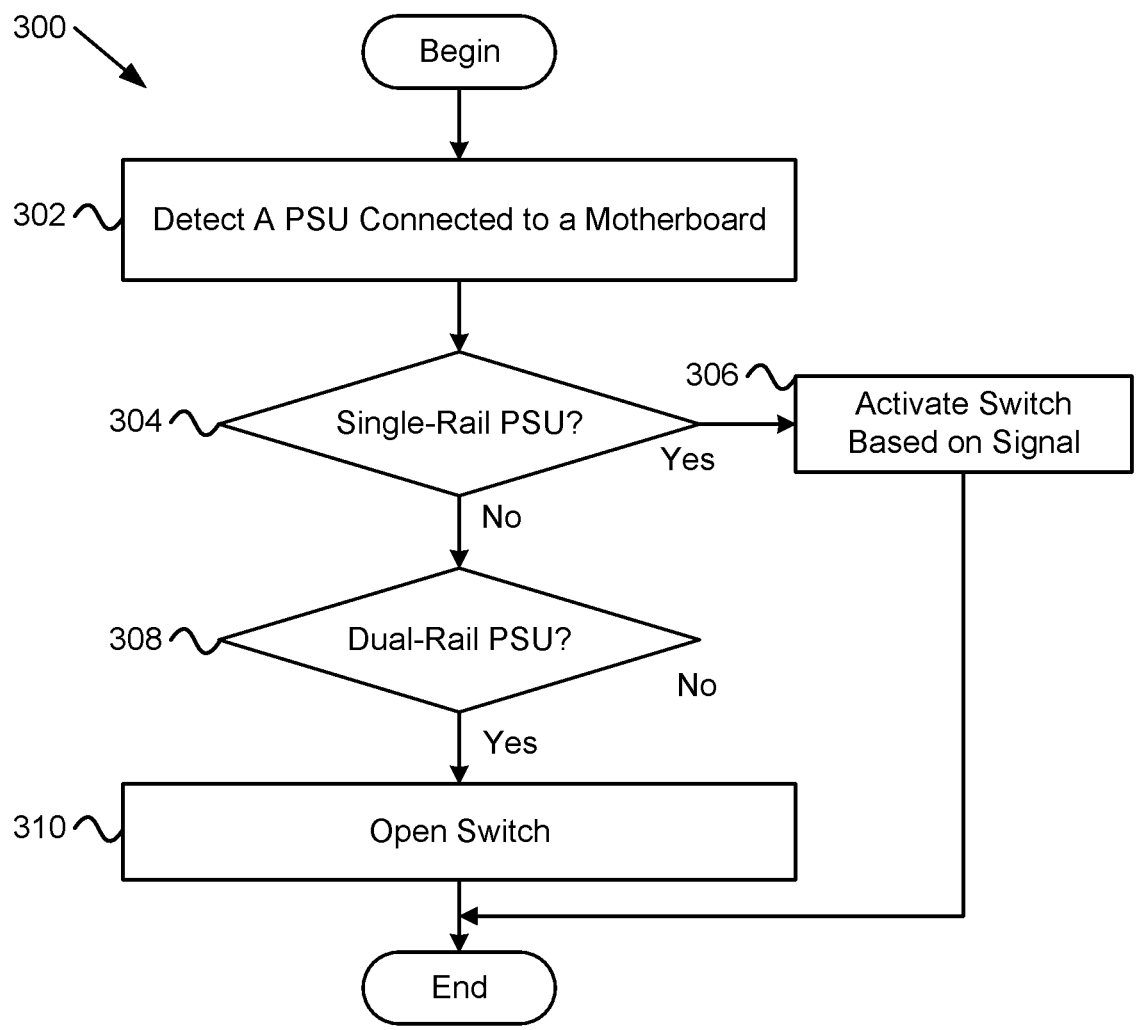
FIG. 3 is a schematic flow chart diagram illustrating one embodiment of a method that supports techniques for supporting multiple PSUs in accordance with the subject matter disclosed herein.

FIG. 3 is a schematic flow chart diagram illustrating one embodiment of a method 300 that supports techniques for supporting multiple PSUs in accordance with the subject matter disclosed herein. In one embodiment, the method 300 may be performed by the motherboard 101, one or more components of the motherboard, a processor 104, a switch 204, and/or the like.

In one embodiment, the method 300 begins and detects 302 that a PSU 110 is connected to a motherboard 101. In one embodiment, the motherboard 101 includes a switch 204 for controlling power supply to the motherboard 101 from the PSU 110. In one embodiment, if the method 300 detects 304 that the PSU 110 is a single-rail PSU, the method 300 activates the switch 204 based on a received signal, e.g., closes the switch 204 in response to a power-on signal to provide main power from the PSU 110 to the motherboard 101 and opens the switch in response to a standby signal to cut main power from the PSU 110 to the motherboard 101. In one embodiment, if the method 300 detects 308 that the PSU 110 is a dual/multiple-rail PSU, the method 300 opens 310 and bypasses the switch 204 such that main power to the motherboard 101 is controlled by the PSU 110 via transmission of the power-on signal and the standby signal, and the method 300 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a motherboard; and
a switch coupled to the motherboard for controlling power supply to the motherboard from a power supply unit ("PSU"),
wherein, in response to detecting a single-rail PSU connected to the motherboard:
the switch is closed in response to a power-on signal to provide main power from the single-rail PSU to the motherboard; and
the switch is opened in response to a standby signal to cut main power from the single-rail PSU to the motherboard,
wherein, in response to detecting a dual-rail PSU connected to the motherboard, the switch is opened and bypassed such that main power to the motherboard is controlled by the dual-rail PSU via transmission of the power-on signal and the standby signal, and
wherein, in response to detecting the single-rail PSU and the dual-rail PSU connected to the motherboard concurrently, the switch is opened such that main power to the motherboard is controlled by the dual-rail PSU to prevent simultaneous operation from both the single-rail PSU and the dual-rail PSU.

2. The apparatus of claim 1, further comprising a PSU connector that is coupled to the motherboard for interfacing with the dual-rail PSU.

3. The apparatus of claim 2, wherein the PSU connector comprises an edge connector that is coupled to an edge of the motherboard.

4. The apparatus of claim 3, wherein the edge connector comprises one or more electrical pins that are configured to detect a connection between the dual-rail PSU and the motherboard.

5. The apparatus of claim 4, wherein the switch is opened in response to detecting the connection between the dual-rail PSU and the motherboard via the edge connector.

6. The apparatus of claim 3, further comprising a power distribution board ("PDB") coupled to the dual-rail PSU and the edge connector for facilitating power distribution from the dual-rail PSU to the motherboard and other hardware components.

7. The apparatus of claim 6, wherein the power-on signal and the standby signal are transmitted to the dual-rail PSU via the PDB.

8. The apparatus of claim 1, wherein the switch comprises a metal-oxide-semiconductor field-effect transistor ("MosFET").

9. The apparatus of claim 1, wherein the switch is closed in response to a PSON_MB_N signal from the motherboard.

10. A computing system, comprising:
   a motherboard;
   a power supply unit ("PSU") operationally coupled to the motherboard; and
   a switch coupled to the motherboard for controlling power supply to the motherboard from the PSU,
   wherein, in response to detecting that the PSU is a single-rail PSU:
      the switch is closed in response to a power-on signal to provide main power from the PSU to the motherboard; and
      the switch is opened in response to a standby signal to cut main power from the PSU to the motherboard,
   wherein, in response to detecting that the PSU is a dual-rail PSU, the switch is opened and bypassed such that main power to the motherboard is controlled by the PSU via transmission of the power-on signal and the standby signal, and
   wherein, in response to detecting the single-rail PSU and the dual-rail PSU connected to the motherboard concurrently, the switch is opened such that main power to the motherboard is controlled by the dual-rail PSU to prevent simultaneous operation from both the single-rail PSU and the dual-rail PSU.

11. The computing system of claim 10, further comprising a PSU connector that is coupled to the motherboard for interfacing with the dual-rail PSU, the PSU connector comprising an edge connector that is coupled to an edge of the motherboard.

12. The computing system of claim 11, wherein the edge connector comprises one or more electrical pins that are configured to detect a connection between the dual-rail PSU and the motherboard.

13. The computing system of claim 12, wherein the switch is opened in response to detecting the connection between the dual-rail PSU and the motherboard via the edge connector.

14. The computing system of claim 11, further comprising a power distribution board ("PDB") coupled to the dual-rail PSU and the edge connector for facilitating power distribution from the dual-rail PSU to the motherboard and other hardware components.

15. The computing system of claim 14, wherein the power-on signal and the standby signal are transmitted to the dual-rail PSU via the PDB.

16. The computing system of claim 10, wherein the switch comprises a metal-oxide semiconductor field-effect transistor ("MosFET").

17. The computing system of claim 10, wherein the switch is closed in response to a PSON_MB_N signal from the motherboard.

18. A method, comprising:
   detecting that a power supply unit ("PSU") is connected to a motherboard, the motherboard comprising a switch for controlling power supply to the motherboard from the PSU;
   in response to detecting that the PSU is a single-rail PSU:
      closing the switch in response to a power-on signal to provide main power from the PSU to the motherboard; and
      opening the switch in response to a standby signal to cut main power from the PSU to the motherboard;
   in response to detecting that the PSU is a dual-rail PSU, opening and bypassing the switch such that main power to the motherboard is controlled by the PSU via transmission of the power-on signal and the standby signal, and
   in response to detecting the single-rail PSU and the dual-rail PSU connected to the motherboard concurrently, opening the switch such that main power to the motherboard is controlled by the dual-rail PSU to prevent simultaneous operation from both the single-rail PSU and the dual-rail PSU.

\* \* \* \* \*